United States Patent [19]
Patterson, III et al.

[11] 4,131,264
[45] Dec. 26, 1978

[54] LOAD BINDER APPARATUS

[76] Inventors: William W. Patterson, III; Eugene F. Grapes, both c/o W. W. Patterson Company 830 Brocket St., Pittsburgh, Pa. 15233

[21] Appl. No.: 864,690

[22] Filed: Dec. 27, 1977

Related U.S. Application Data

[63] Continuation-in-part of Ser. No. 805,185, Jun. 9, 1977, abandoned.

[51] Int. Cl.² ............................................. B66F 3/10
[52] U.S. Cl. ..................................................... 254/67
[58] Field of Search ........................... 254/67, 100, 83; 403/43–48

[56] References Cited
U.S. PATENT DOCUMENTS 1,047,428   12/1912   McKee ..................................... 254/67

FOREIGN PATENT DOCUMENTS 380846   9/1923   Fed. Rep. of Germany ............. 254/67

Primary Examiner—Robert C. Watson
Attorney, Agent, or Firm—Buell, Blenko & Ziesenheim

[57] ABSTRACT

A load binder or lashing tightener is provided made up of a first inner elongate sleeve member closed at one end, an anchor fitting on said closed end, a thread nut in the other end of said first sleeve, a second outer sleeve having one end adapted to telescope over the first inner sleeve, anchor means on said second sleeve adjacent the other end, screw means extending through the second sleeve, one end threadingly engaging the nut in said first sleeve, the other end rotatably fixed in the said other end of said second sleeve and drive means on said other end for rotating said screw whereby said second sleeve is caused to telescope over the first sleeve and the anchor means on said sleeves are brought together.

9 Claims, 4 Drawing Figures

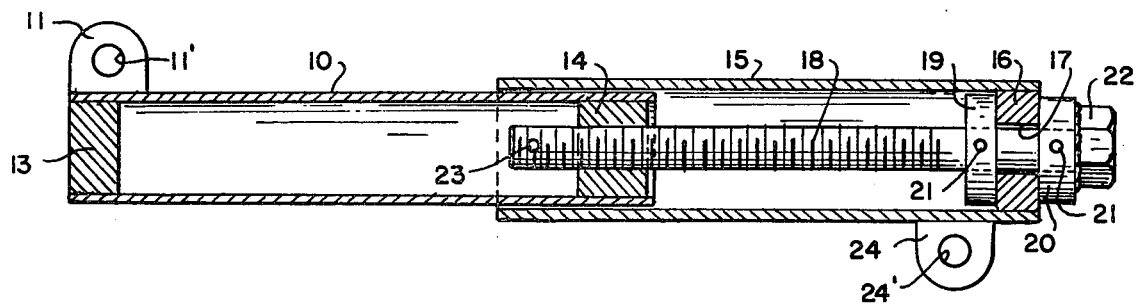
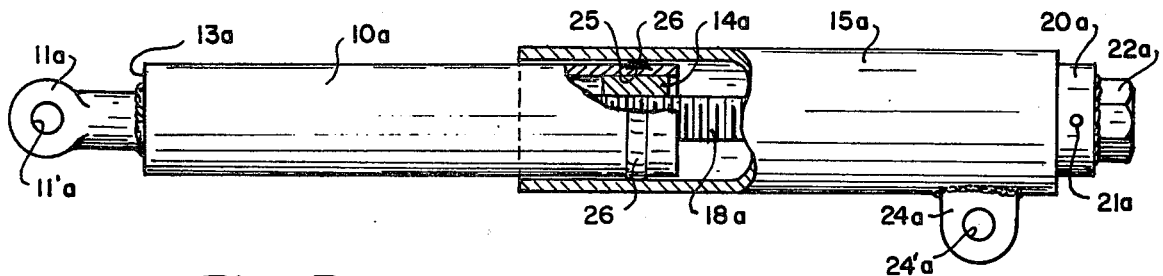
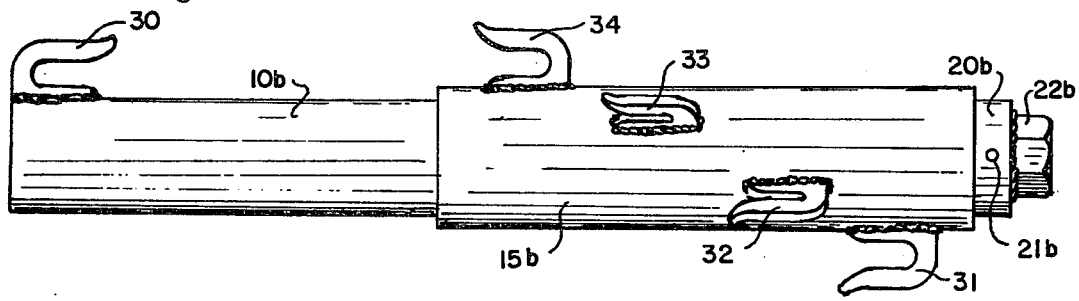
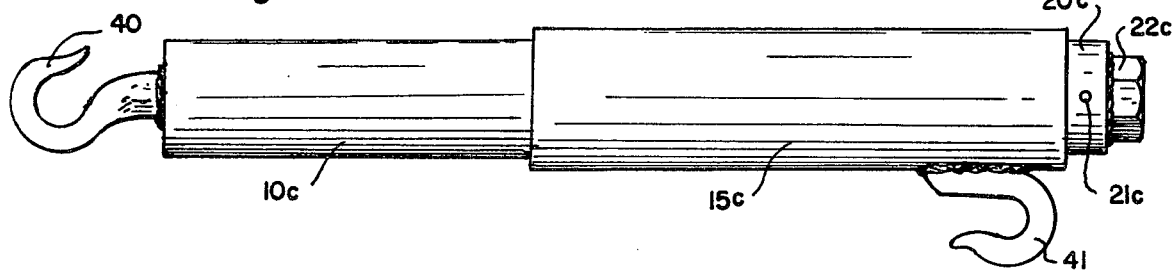

LOAD BINDER APPARATUS

This application is a continuation-in-part of our co-pending application Ser. No. 805,185, filed June 9, 1977 now abandoned.

The present invention relates to load binder apparatus and particularly to a quick power lashing mechanism for tightening lashing cables and chains and the like rapidly to bind or lash a load in place.

Load binder and lashings of many kinds have been employed in binding a load in place as for example on a truck bed, a ship deck or hold, a railway car, etc.

In the past, load binders have generally been of the ratchet type or the cam lever type. In the ratchet type binder, tightening is relatively slow. In the case of the cam lever type, they may be applied quickly but they have a very limited travel and are prone to come loose and release the load.

We have invented a load binder or lashing apparatus which overcomes these difficulties. Our load binder is quickly applied and will not release its load unless improperly applied. Unlike turnbuckles, the threads are completely enclosed and driven by a nut driver such as an air or electric wrench. And, unlike both turnbuckles and lever cam binders, the binder of our invention cannot be readily tampered with or loosened without a proper wrench.

We provide a load binder comprising a first elongate sleeve member closed at end and carrying an anchor fitting at said one end, the other end of said first sleeve is provided with a threaded nut fixed therein, a second sleeve member sufficiently larger in internal diameter so as to telescope over the first sleeve is provided, one end of said second sleeve receiving said other end of said first sleeve in telescopic relation, the other end of said second sleeve is provided with a collar through which extends a threaded screw engaged in the nut of the first sleeve and having a driver nut head whereby said screw is rotated in the nut to move the second sleeve relative to the first and an anchor fitting on said second sleeve adjacent said other end of said second sleeve. Preferably, the screw is provided with load collars of bearing material fixed thereto on opposite sides of the swivel collar to provide reduced friction between the several collars. A stop or lock pin is preferably provided on the end of the screw within the first sleeve to prevent its removal from the nut. The anchor fittings are preferably in the form of clevises, however, they may be eye hooks, or any type of anchor fitting. Preferably the anchor fittings are on the sides of the sleeves, on diametrically opposite sides, with the sleeves being freely rotatable relatively to one another. In a preferred form, several anchor fittings are provided along the length of the sleeve.

In the foregoing general description we have set out certain objects, purposes and advantages of our invention. Other objects, purposes and advantages of this invention will however be apparent from a consideration of the following description and the accompanying drawings in which:

FIG. 1 is a longitudinal sectional view of one embodiment of our invention;

FIG. 2 is a side elevational view partly in section of a second embodiment of our invention;

FIG. 3 is an elevational view of a third embodiment of our invention; and

FIG. 4 is an elevational view of a fourth embodiment of our invention.

Referring to the drawings, we have illustrated in FIG. 1 a first sleeve member 10 of tubular cylindrical form having a clevis 11 welded on cylinder 10 above end plug 13 welded in and closing one end of the sleeve. The other end of sleeve 10 is provided with an Acme threaded nut 14 welded thereon. A second cylindrical sleeve 15 is arranged to telescopically receive first sleeve 10 in one end thereof and is provided at the opposite end with a swivel collar 16 having a hole 17 through which passes Acme threaded screw 18. Screw 18 is provided at one end with spaced load collars 19 and 20 on opposite sides of swivel collar 16. Load collars 19 and 20 are preferably of bearing material such as brass or bronze and are held in place by pins 21. This same one end is provided with a driver nut 22 welded thereon for rotating the screw. The opposite end of the screw 18 passes through nut 14 in first sleeve 10 and is provided with a lock pin 23. A clevis 24 is fixed on the side wall of second sleeve 15 adjacent the end remote from clevis 11.

In use, the screw 18 is rotated to move the two sleeves apart as in FIG. 1; a pin (not shown) is inserted through holes 11' in clevis 11 and through loop (not shown) in one end of a cable lashing, or a link (not shown) of a chain lashing as the case may be, another pin (not shown) is inserted through hole 24' in clevis 24 and through a loop (not shown) or a chain link (not shown) at the opposite end of the lashing. The nut 22 is engaged by a nut driver and rotated to run the screw 18 through nut 14 into the interior of sleeve 10 causing the sleeves to telescope, 15 over 10 and thus bring clevises 11 and 24 toward each other, tightening the cable or chain lashing. The lashing is released by reversing the rotation of screw 18 to move the sleeves and clevises apart. The screw 18 is totally enclosed in this structure and is thus unaffected by dirt, weather or any of the circumstances which cause binders of the prior art to be inoperable or even fail. Placing the clevises 11 and 24 on the sides permits the cylinders 10 and 15 to swivel relatively to one another under load. This provides much greater efficiency of operation than the other embodiments illustrated except that of FIG. 3, which is the same. By efficiency we mean that the embodiments of FIGS. 1 and 3 require much less effort applied to screw 22 to attain a given level of tension on the load being lashed.

In FIG. 2, we have shown a structure precisely like that of FIG. 1 with like parts bearing like numbers with the suffix a, except that in the embodiment we have provided a sealant groove 25 in the external wall of the inner sleeve 10a at nut 14a and have fixed clevis 11a in the center of plug 13. A graphite impregnated felt seal ring 26 is inserted in this groove 25 and bears against the inner wall of outer sleeve 15a. This acts further to seal the device against water and dirt and aids in carrying the telescoping members with a minimum of friction.

In FIG. 3 we have illustrated a third embodiment of our invention similar to FIG. 1 with like parts carrying identical numerals with the suffix b. In this embodiment hooks 30 and 31–34 have been substituted for clevises 11 and 24 of FIG. 1. The structures are otherwise basically identical. The addition of hooks 32–34 at spaced intervals along and around barrel 15b permits enagement of a chain or similar lashing at the most useful position to achieve maximum tightening with need to change positions on the lashing. Since barrel 15b is rotatable relatively to barrel 10b, the particular hook (31-34) which is used for lashing will simply rotate automatically into position on the opposite side from hook 30 as the binder is tightened.

In FIG. 4 we have illustrated a fourth embodiment of our invention similar to FIG. 1 with like parts carrying like identifying numerals with the suffix c. In this embodiment hooks 40 and 41 have been substituted for clevises 11 and 24 of FIG. 1. The structures are otherwise identical.

We have illustrated a driver nut head on the screw of our structure, however, the screw could be provided with a bevel gear driver or a worm gear drive of known form with the drive at right angles to the screw.

While we have illustrated and described certain preferred practices and embodiments of our invention in the foregoing specification, it will be understood that this invention may be otherwise embodied within the scope of the following claims.

We claim:

1. A load binder or lashing tightener apparatus comprising a first inner elongate sleeve member closed at one end, an anchor adjacent said closed end, a threaded nut fixed in the other end of said first sleeve, a second outer sleeve having one end adapted to telescope over the first inner sleeve in close fitting relationship, at least one anchor means on said second sleeve adjacent the other end, screw means extending through the second sleeve, one end threadingly engaging the nut in said first sleeve, the other end rotatably fixed in the said other end of said second sleeve and drive means on said other end for rotating said screw whereby said second sleeve is caused to telescope over the first sleeve and the anchor means on said sleeves are brought together, said sleeves being freely rotatable relative to one another, and wherein the sleeves are of cylindrical form having anchor means on each of said sleeves adjacent their remote ends extending radially outward from each sleeve generally on opposite sides from each other, said sleeves being freely relatively rotatable whereby said anchor means are free to align themselves to provide maximum pull through the binder.

2. A load binder or lashing tightener as claimed in claim 1 wherein the anchor means on each of said sleeves is a clevis.

3. A load binder or lashing tightener as claimed in claim 1 wherein the anchor means on each said sleeves is a hook.

4. A load binder or lashing tightener as claimed in claim 1 wherein the anchor means on each said sleeves is an eye.

5. A load binder or lashing tightener as claimed in claim 1 having sealing means between the inner and outer sleeves adjacent the said other end of said inner sleeve.

6. A load binder or lashing tightener as claimed in claim 5 wherein the sealing means is a graphite impregnated felt ring carried in an annular groove in said first sleeve.

7. A load binder or lashing tightener apparatus comprising a first inner elongate sleeve member closed at one end, an anchor adjacent said closed end, a threaded nut fixed in the other end of said first sleeve, a second outer sleeve having one end adapted to telescope over the first inner sleeve in close fitting relationship, at least one anchor means on said second sleeve adjacent the other end, screw means extending through the second sleeve, one end threadingly engaging the nut in said first sleeve, the other end rotatably fixed in the said other end of said second sleeve and drive means on said other end for rotating said screw whereby said second sleeve is caused to telescope over the first sleeve and the anchor means on said sleeves are brought together, said sleeves being freely rotatable relative to one another, and wherein the anchor means on said first sleeve member extends radially outwardly therefrom and the second outer sleeve has a plurality of anchor means spaced apart lengthwise of said sleeve and extending radially outwardly therefrom.

8. A load binder or lashing tightener as claimed in claim 7 wherein the anchor means are hooks.

9. A load binder as claimed in claim 7 wherein the anchor means are spaced apart lengthwise and circumferentially of said second sleeve member.

* * * * *